Feb. 16, 1960  E. E. ROBINS ET AL  2,925,298
HOIST HOOK BLOCK
Filed Dec. 13, 1955

INVENTORS
ERFORD E. ROBINS
HUMPHREY F. PARKER
BY LOREN W. LERCH

Bean, Brooks, Buckley, Bean,
ATTORNEYS

United States Patent Office 2,925,298
Patented Feb. 16, 1960

2,925,298

HOIST HOOK BLOCK

Erford E. Robins, North Tonawanda, and Humphrey F. Parker and Loren W. Lerch, Buffalo, N.Y., assignors to Columbia McKinnon Chain Corporation, Tonawanda, N.Y.

Application December 13, 1955, Serial No. 552,934

1 Claim. (Cl. 294—78)

This invention relates to chain hoists, and more particularly to improvements in the load lift devices thereof such as are known as the "lower hook block" components of such mechanisms.

One of the objects of the invention is to provide a structurally simplified but functionally improved load lift hook block for use in connection with chain hoists of various types.

Other objects and advantages of the invention will appear from the specification hereinafter.

Figure 1:
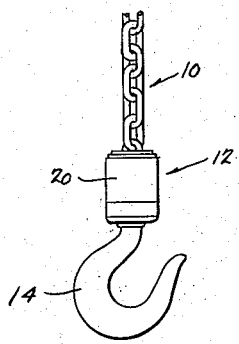
Fig. 1 is a fragmentary side elevational view of a chain hoist load lift chain equipped with a lower hook block of the invention.
Figure 2:
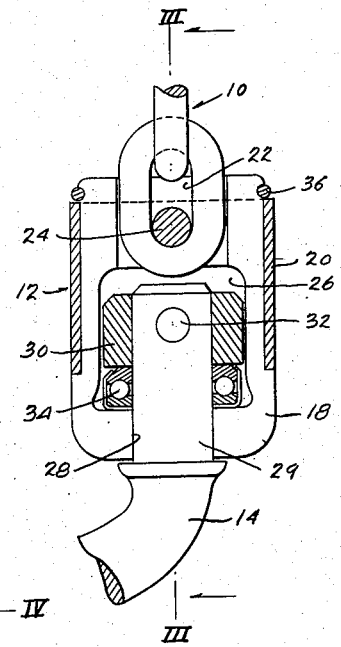
Fig. 2 is a fragmentary vertical section, on an enlarged scale, of the hook block of Fig. 1.
Figure 3:
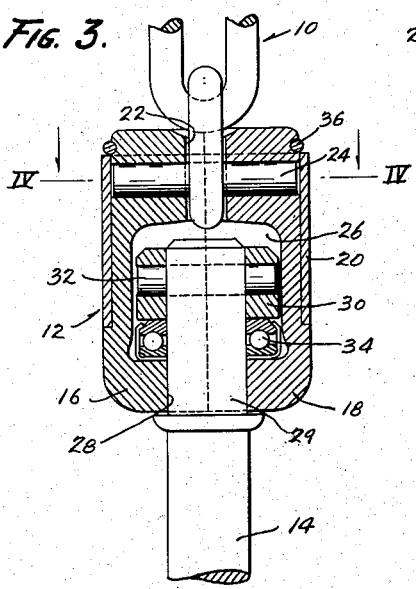
Fig. 3 is a fragmentary section taken along line III—III of Fig. 2.
Figure 4:
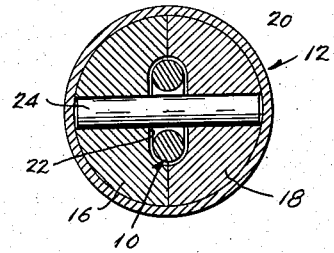
Fig. 4 is a section taken along line IV—IV of Fig. 3.

In the drawing, the hook block of the invention is shown as being mounted in conjunction with a load lift chain designated generally 10; the hook block being designated generally at 12, and being shown as carrying a load lift hook 14. The block 12 comprises essentially a pair of semi-cylindrical half-block portions 16, 18 which are externally reduced to receive in slip-fitting relation thereabout a locking sleeve 20 which normally operates to hold the two halves together in assembled relation as shown in the drawing. Adjacent their upper ends, the block halves 16, 18 are complementarily recessed at their contiguous faces as indicated at 22 to receive the lowermost link of chain 10. The block parts are also bored in transverse alignment so as to receive therein opposite ends of a load chain anchor pin 24 which extends through the lowermost link of the chain 10, thus locking the hook block 12 to the load chain 10. The central body portions of the block halves 16, 18 are interiorly recessed as indicated at 26 and bored as indicated at 28 to accommodate in swivelable relation therein the shank portion 29 of the load lift hook 14 and a support collar therefor as indicated at 30. The collar 30 is fixed to the upper end of hook shank 29 by means of a transverse pin 32, and an end thrust bearing device as indicated at 34 is preferably disposed below the collar 30 so as to render the hook freely swivelable in the hook block 12.

Thus, it will be appreciated that the two block halves 16, 18 are symmetrically formed of generally semi-cylindrical shapes and adapted to clasp at opposite sides upon the chain anchor pin 24 and upon the shank and collar assembly of the lift hook 14; thereby locking upon these parts in such manner as to interconnect them while at the same time completing an outwardly cylindrical formation. The locking sleeve 20 is then slip-fitted downwardly upon the block halves so as to hold them in the assembled relation shown in the drawing herewith; whereupon a snap ring as indicated at 36 is preferably sprung into a complementary-shaped peripheral groove around the assembly, so as to hold the locking sleeve 20 in operative position.

Thus, it will be appreciated that the hook block of the invention is readily fabricated of inexpensively manufactured parts, and easily assembled to complete a hook block of structurally simple yet rugged form which is compactly dimensioned and carries a load lift hook in freely swivelable relation therebelow.

Although only one specific form of the invention has been illustrated and described in detail herein, it will of course be understood that various changes may be made therein without departing from the spirit of the invention or the scope of the appended claim.

What is claimed is:

In a chain hoist, a load hook block comprising a pair of symmetrically shaped separable block part members adapted to be relatively assembled in face-to-face relation, the contiguous faces at the upper end portions of said block part member being complementarily recessed and opening onto the top thereof and receiving in transverse mounted relation therein a chain anchor pin and one end of a chain link when engaged about said pin, the lower end portions of said block part members being complementarily recessed at the contiguous faces thereof to present a bore opening through the bottom of said block and an enlarged chamber confined between the ends of the block, said bore accommodating in freely rotatable relation the shank portion of a hoist load lift hook, said chamber accommodating interiorly of said block an enlarged collar surrounding the upper extremity of said shank portion of said load lift hook, said collar being of a diameter just slightly less than the diameter of said chamber and having a transverse bore therethrough aligned with a transverse bore in said shank and receiving therethrough a pin, the last mentioned pin being of a length to substantially completely extend through said collar whereby the assembled block part members retain said last pin in operative position within said collar, said body part members at the bottom defining said chamber being flat, an end thrust bearing surrounding said shank below said collar within said block and seated upon said flat bottom of the chamber, said block having the major portion of its outer surface extending from a point above the bottom thereof upwardly through the top extremity thereof of reduced diameter, a locking sleeve slip fitted about said block part members and covering the reduced diameter portion thereof in snugly fitting relationship so as to hold the block part members together and retain said last pin operatively within said collar, said locking sleeve being of a length just slightly less than the extent of the reduced diameter portion of said block part members so as to surround the major extent of said block part members and extending in overlapping relationship to the transverse bore through said block part members receiving the first mentioned pin so as to retain such pin in operative position, the upper extremity of said block part members having an annular groove therein, and a snap ring device elastically engaged in said groove and overlying the upper extremity of said locking sleeve so as to thereby prevent unintended disassembly of said locking sleeve relative to said block part members.

References Cited in the file of this patent

UNITED STATES PATENTS

| | | |
|---|---|---|
| 2,231,416 | Stahl | Feb. 11, 1941 |
| 2,445,715 | Jennings | July 20, 1948 |
| 2,493,282 | Criswell | Jan. 3, 1950 |
| 2,739,789 | Smith | Mar. 27, 1956 |

FOREIGN PATENTS

| | | |
|---|---|---|
| 19,790 of 1914 | Great Britain | Aug. 12, 1915 |

UNITED STATES PATENT OFFICE

CERTIFICATE OF CORRECTION

Patent No. 2,925,298            February 16, 1960

Erford E. Robins et al.

It is hereby certified that error appears in the above numbered patent requiring correction and that the said Letters Patent should read as corrected below.

In the grant, lines 3 and 13, and in the heading to the printed specification, line 5, name of assignee, for "Columbia McKinnon Chain Corporation", each occurrence, read -- Columbus McKinnon Chain Corporation --.

Signed and sealed this 16th day of August 1960.

(SEAL)
Attest:

KARL H. AXLINE
Attesting Officer

ROBERT C. WATSON
Commissioner of Patents